June 3, 1952  J. A. HARRELL  2,598,789
PIE HOLDER
Filed Oct. 13, 1949
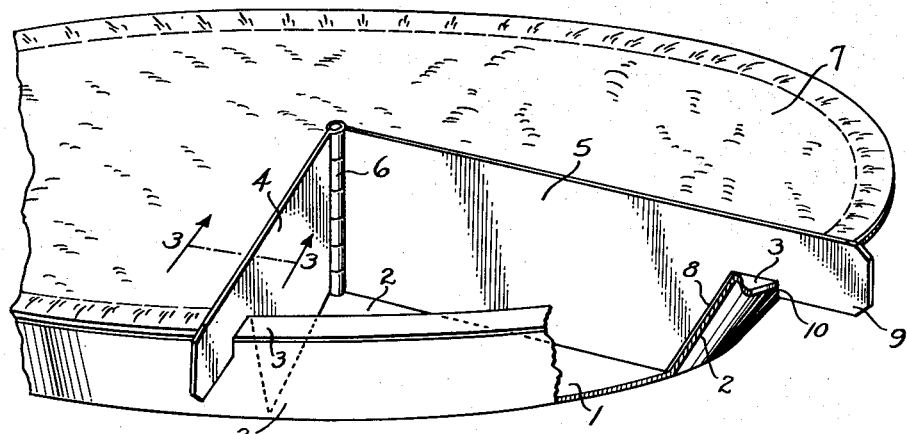
Fig. 1.
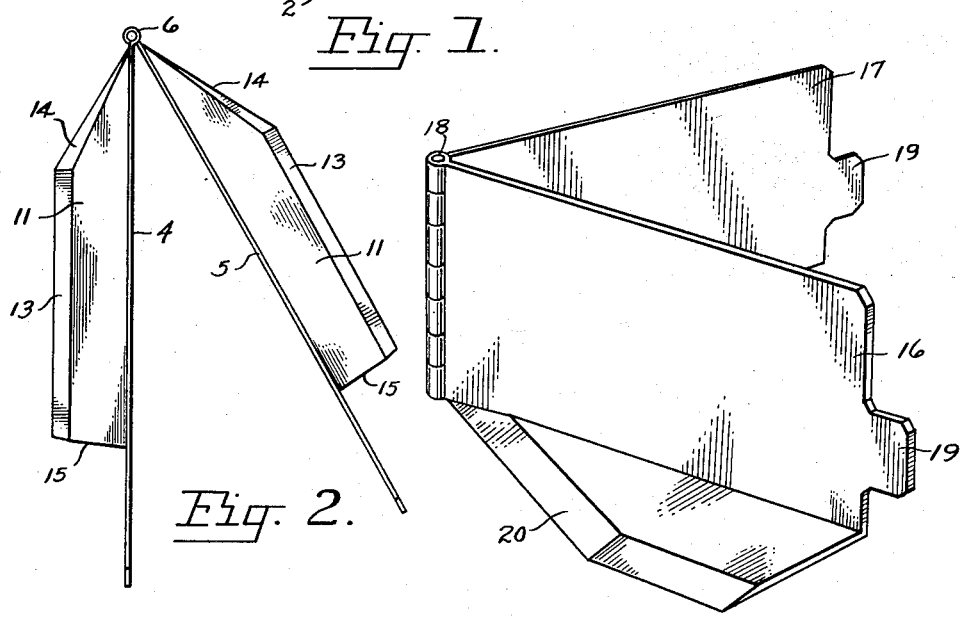
Fig. 2.
Fig. 4.
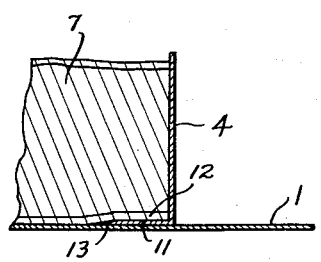
Fig. 3.
INVENTOR.
James A. Harrell
BY
His Agent

UNITED STATES PATENT OFFICE 2,598,789

PIE HOLDER

James A. Harrell, Portland, Oreg.

Application October 13, 1949, Serial No. 121,109

3 Claims. (Cl. 65—12)

This invention pertains to devices for protecting the exposed edges of freshly cut food products, and relates particularly to a novel device for protecting the exposed edges of pies from which one or more pieces have been removed.

It is the general experience that pies, cakes and other food products which are cut in wedge-shaped pieces for serving tend to dehydrate substantially at the exposed surfaces resulting from removal of one or more serving pieces from the whole. At the next serving it is the usual practice to cut away the stale edges, thereby resulting in waste of substantial portions of the food.

The serving of pies has heretofore been attended by another common difficulty. Although bakers generally aspire to produce pies in which the fillings are substantially firm, it is not unusual to prepare an occasional pie in which the filling is quite fluid. When one or more serving pieces have been removed from a pie of the latter construction, the fluid filling of the remainder tends to collapse and flow outwardly into the vacated area of the pie tin.

It is a principal object of the present invention, therefore, to provide a novel device for holding the exposed edges of pies from which a portion has been removed to prevent collapse and displacement of the filling thereof and to inhibit dehydration of said edges.

Another important object of this invention is the provision of a holder for protecting the exposed edges of the remaining portion of wedge-cut food products, which holder is of simple construction, efficient operation and is manipulated with ease.

A further object of this invention is the provision of a pie holder in which means is provided for automatically centering said holder within a pie tin.

A still further object of this invention is to provide a pie holder constructed in such manner as to prevent its radial displacement relative to the pie tin within which said holder is accommodated.

These and other objects and advantages of the present invention will appear from the following detailed description taken in connection with the accompanying drawing, in which:

Figure 1 is a fragmentary perspective view illustrating the manner in which a holder embodying the features of the present invention is utilized in protecting the exposed edges of a pie, a portion of the pie tin being cut away to disclose details of operation and construction of the holder;

Figure 2 is a plan view of the holder shown in Figure 1;

Figure 3 is a fragementary sectional view taken along the line 3—3 in Figure 1; and Figure 4 is a perspective view of a modified form of holder embodying the features of the present invention and adapted for use in the protection of cakes and other substantially solid foods of similar shape.

The holder embodying the features of the present invention may be used to advantage in protecting the exposed edges of many types of food products from which portions are cut and served in wedge-shaped pieces. The holder is of particular utility in protecting the exposed edges of cut pies contained in the conventional pie tin or baking dish which, as shown in Figure 1, comprises a flat circular bottom 1 bounded by a wall 2 which diverges upwardly, terminating in a flat rim 3. The pie holder comprises a pair of elongated plates 4, 5 joined together at one of their respective ends by means of a hinge 6. Said plates are proportioned and arranged to extend radially along the exposed edges of the cut pie 7 with the hinge 6 disposed at the apex of the wedge-shaped opening. The apex ordinarily is located at the center of the pie. The hinge preferably extends the full lateral width or depth of the plates and is of closed construction in order to prevent the passage of pie filling into the area from which a portion of the pie has been removed.

The end of each plate opposite the hinge 6 is formed with an edge 8 which slopes upwardly at an angle corresponding with the slope of the wall 2 of the pie dish. Thus, as clearly shown in Figure 1 of the drawing, a seal is provided between the edge 8 and the wall of the pie dish to prevent passage of the pie filling therebetween. The plate is extended outwardly adjacent the edge 8 to form a finger grip 9 or other handle means by which manipulation of the pie holder is facilitated. As stated hereinbefore, the distance between the hinge 6 and the opposite edge 8 of the plate is preferably chosen in such manner that, when the edge 8 rests against the wall 2, the hinge 6 is positioned at the center of the pie dish perpendicular to the bottom 1.

In order to prevent radial displacement of the plates 4, 5 and thereby insure maintenance of the edge 8 of each plate in position contact with the sloping wall 2 of the pie dish, the bottom edge of each plate between the sloping wall 2 and the finger grip 9 is provided with an abutment for engaging the outer periphery of the rim 3. Said abutment may be formed in any desired manner.

For example, as shown in Figure 1 of the drawing, the handle portion 9 is extended downwardly adjacent the rim 3 to form an abutting edge 10 which engages the outer periphery of the rim to prevent inward radial displacement of the holder. Alternatively, the abutting edge 10 may be provided by extending a pin or other projection downwardly adjacent the rim 3 from that portion of the plate which extends outwardly from said rim.

Projecting laterally from the bottom edge of each of the plates 4 and 5 is a flat blade 11. Said blade extends substantially normal to the plane of the plate and projects outwardly from the side of the plate against which the exposed edge of the pie comes in contact. The blade is sufficiently thin in cross section to afford ready insertion under the bottom crust 12 of the pie 7, as clearly shown in Figure 3 of the drawing. In this manner the weight of the pie overlying the blades maintains the plates 4 and 5 in proper position against the exposed edges of the cut pie. If desired, the outer edge 13 of each blade 11 may be beveled, as shown, in order to facilitate insertion of the holder. The edge 14 of the forward portion of each blade 11, i. e. the portion adjacent the hinge 6, preferably extends obliquely rearward from said hinge at an angle which permits the holder to be rotated, without interference from said blades, to a position in which the plates 4 and 5 are capable of protecting the exposed edges of a single wedge-shaped piece of pie.

The rearward edge 15 of each of the blades 11 is preferably curved to conform with the curvature of the pie dish at the juncture of the bottom 1 and sloping wall 2. This curvature is desirable in those instances wherein the blades 11 extend the full radial distance of the bottom 1. Shorter blades may be provided, however, it being necessary only that said blades be of such length and width that the pressure exerted thereon by the overlying portion of pie is sufficient to inhibit displacement of the holder after installation. While it is desired that the blades 11 remain separated throughout the operable range of the holder, the forward ends may overlap slightly without disadvantage if the blades are sufficiently thin in cross section.

The holder illustrated in Figure 4 of the drawing is particularly adapted for use in protecting the exposed cut edges of cakes and other substantially solid foods which are served in wedge-shaped pieces. Inasmuch as such foods are normally served from a platter or other dish which has no upstanding bounding wall, the abutments 10 provided for the pie holder previously described are not necessary. The structures are otherwise substantially the same, with the exception that the plates 16, 17 are of greater height to accommodate the increased thickness of such food products. Said plates are joined together at one of their ends by means of hinge 18, and may be provided at their opposite free ends with handles 19.

The laterally extending blades 20 operate in similar manner to the blades 11 to engage the bottom of the food to be protected. As shown in Figure 4, the blades 20 may be extended laterally, if desired, a distance sufficient to underlie a substantial area of the next wedge-shaped piece of food to be cut for serving. After the cut has been made, the abutting plate and underlying blade may be moved, with the aid of its handle 19, toward the opposite plate. The severed wedge is thereby moved away from the main body of food and disposed more favorably for removal to a serving dish. The blades 11 of the pie holder described hereinbefore may be extended in similar manner if the function just described is desired to be incorporated therein.

It is evident that many modifications equivalent to the blades 11 and 20 may be substituted therefor without departing from the scope and spirit of the present invention. For example, the blades may be slotted transversely of their length to form a plurality of laterally extending tines. Accordingly, the term flange means is employed in the appended claims to denote the blades 11 and 20, tines, or other equivalent structure which functions to engage the bottom of the pie, cake or other food product with which the holder may be used.

The holder of the present invention may be constructed of metal, synthetic plastic materials, or wood. Metal is preferred for holders which at times may be subjected to elevated temperatures. For example, metal pie holders are of advantage since the remaining portion of the pie may be heated prior to serving without removal of the holder. Holders for certain pies, cakes and other foods which are normally served while cold may preferably be constructed of plastic or wood.

Having thus described the present invention and the manner in which the same may be used, what I claim as new and desire to secure by Letters Patent is:

1. A device for protecting the exposed edges of food remaining in a circular walled dish after removal of a wedge-cut portion therefrom, said device comprising a pair of plates hingedly joined together at one of their respective ends, said plates being proportioned and arranged to engage the exposed edges to be protected, the free end of each plate having an edge complementing the slope of the dish wall, handle means on the free end of each plate, abutment means on each handle spaced from said complementing edge for freely engaging the outer periphery of the dish wall, whereby to maintain contact of said wall and complementing edge and to maintain the hinged ends of the plates at the center of the dish, and a blade extending laterally from the base of each plate for engaging the bottom of the food.

2. A device for protecting the exposed edges of food remaining in a circular walled dish after removal of a wedge-cut portion therefrom, said device comprising a pair of plates hingedly joined together at one of their respective ends, said plates being proportioned and arranged to engage the exposed edges to be protected, the free end of each plate having an edge complementing the slope of the dish wall, handle means on the free end of each plate, said handle means being offset to form an abutment spaced from said complementing edge for freely engaging the outer periphery of the dish wall, whereby to maintain contact of said wall and complementing edge and to maintain the hinged ends of the plates at the center of the dish, and flange means extending laterally from the base of each plate for engaging the bottom of the food adjacent the edge to be protected.

3. A device for protecting the exposed edges of food remaining in a circular walled dish after removal of a wedge-cut portion therefrom, said device comprising a pair of plates hingedly joined together at one of their respective ends, said plates being proportioned and arranged to engage the exposed edges of the food to be protected, the free end of each plate having an edge complementing the slope of the dish wall, each plate extending over the dish wall beyond the outer periphery of the latter to form a projecting handle section, each handle section being notched adjacent the complementing edge to form an abutment for freely engaging the outer periphery of the dish wall, whereby to maintain the complementing edge of each plate in contact with the dish wall and to maintain the hinged ends of the plates at the center of the dish, and flange means extending laterally from the base of each plate for engaging the bottom of the food adjacent the edge to be protected.

JAMES A. HARRELL.

REFERENCES CITED

The following references are of record in the file of this patent:

UNITED STATES PATENTS

| Number | Name | Date |
|---|---|---|
| 168,437 | Wells | Oct. 5, 1875 |
| 400,537 | Barry | Apr. 2, 1889 |
| 580,337 | Tobelman | Apr. 6, 1897 |
| 634,330 | Gans | Oct. 3, 1899 |
| 1,047,920 | Daution | Dec. 24, 1912 |
| 2,304,966 | Thrower | Dec. 15, 1942 |
| 2,322,046 | Miller | June 15, 1943 |
| 2,327,988 | Bassett | Aug. 31, 1943 |
| 2,354,822 | Meyran | Aug. 1, 1944 |
| 2,546,800 | Thiac et al. | Mar. 27, 1951 |
| 2,573,577 | Koponen | Oct. 30, 1951 |

FOREIGN PATENTS

| Number | Country | Date |
|---|---|---|
| 286,552 | Germany | Aug. 12, 1915 |
| 529,657 | Germany | Apr. 23, 1930 |
| 532,237 | France | Nov. 10, 1921 |
| 653,887 | France | Nov. 19, 1928 |
| 692,759 | France | Aug. 5, 1930 |